(12) United States Patent
Tanibata

(10) Patent No.: US 6,330,016 B1
(45) Date of Patent: Dec. 11, 2001

(54) IMAGE RECORDING APPARATUS AND IMAGE RECORDING METHOD

(75) Inventor: Toru Tanibata, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/436,497

(22) Filed: Nov. 9, 1999

(30) Foreign Application Priority Data

Nov. 10, 1998 (JP) .................................................. 10-336568
Nov. 10, 1998 (JP) .................................................. 10-336569

(51) Int. Cl.$^7$ .................................................. B41J 2/435
(52) U.S. Cl. ........................... 347/236; 347/136; 347/246
(58) Field of Search ..................................... 347/136, 236, 347/237, 238, 240, 241, 246; 349/2, 3, 33, 69; 359/323; 355/37

(56) References Cited

U.S. PATENT DOCUMENTS

| | | | |
|---|---|---|---|
| 5,093,676 | * 3/1992 | Matsubara et al. | 347/136 |
| 5,122,831 | * 6/1992 | Suzuki | 355/37 |
| 5,661,544 | 8/1997 | Ishikawa et al. | 355/41 |
| 5,790,240 | * 8/1998 | Ishikawa et al. | 355/68 |
| 6,034,710 | * 3/2000 | Kawabe et al. | 347/236 |

FOREIGN PATENT DOCUMENTS

| | | |
|---|---|---|
| 0 798 593 A2 | 10/1997 | (EP) . |
| 0 948 192 A2 | 10/1999 | (EP) . |
| 6-347923 | 12/1994 | (JP) . |

* cited by examiner

*Primary Examiner*—N. Le
*Assistant Examiner*—Hai C. Pham
(74) *Attorney, Agent, or Firm*—Armstrong, Westerman, Hattori, McLeland & Naughton, LLP.

(57) ABSTRACT

An image recording apparatus includes a PLZT head. The PLZT head performs an interval exposure based on an interval exposure data between exposures of photosensitive material. Further, exposure data of a predetermined number of lines already used in an N-th and preceding exposures may be maintained in a RAM as a basis of correction to an exposure data for an N+1-th print. The PLZT head performs an exposure for an exposure time given by the corrected exposure data.

18 Claims, 11 Drawing Sheets

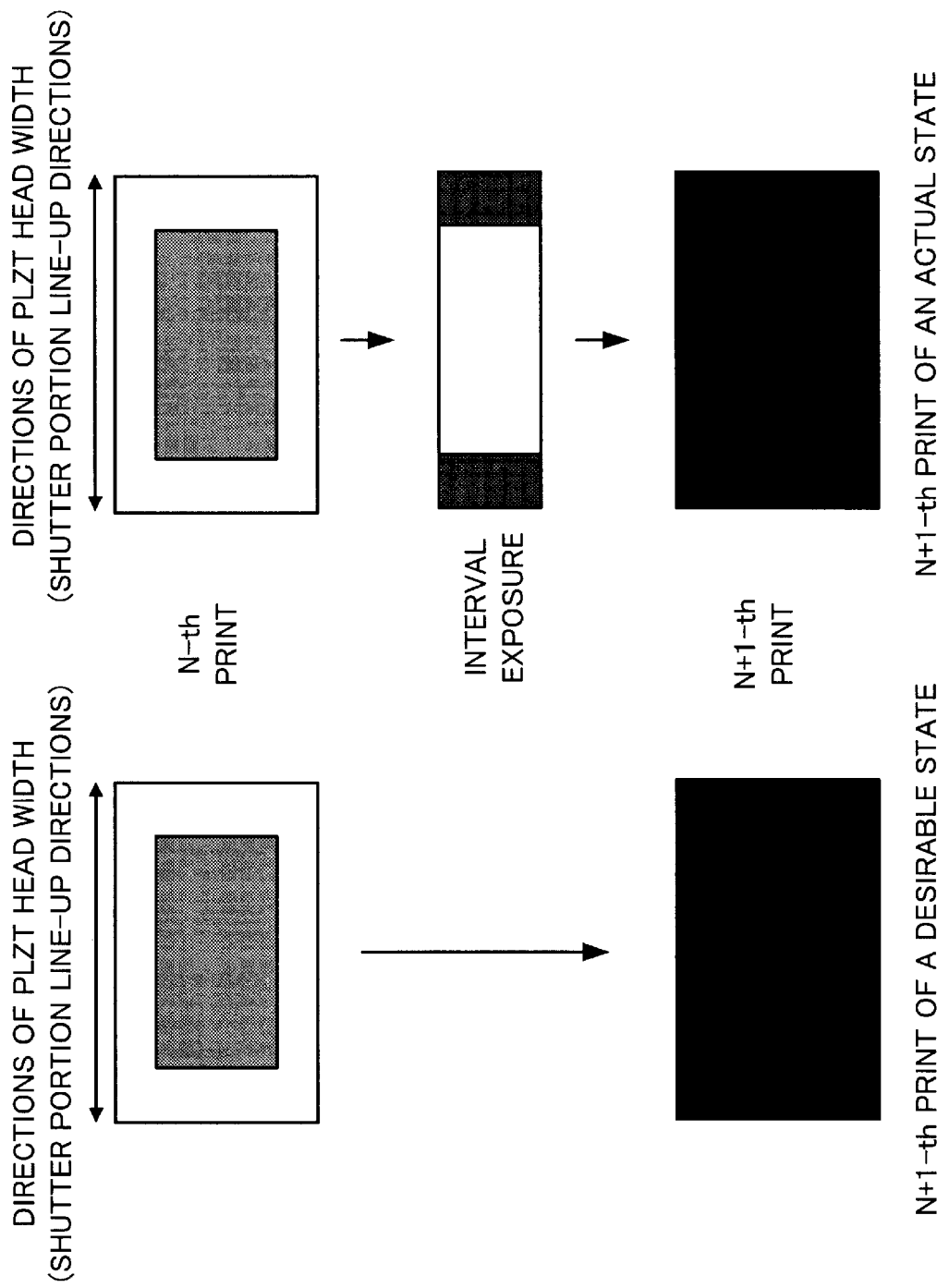

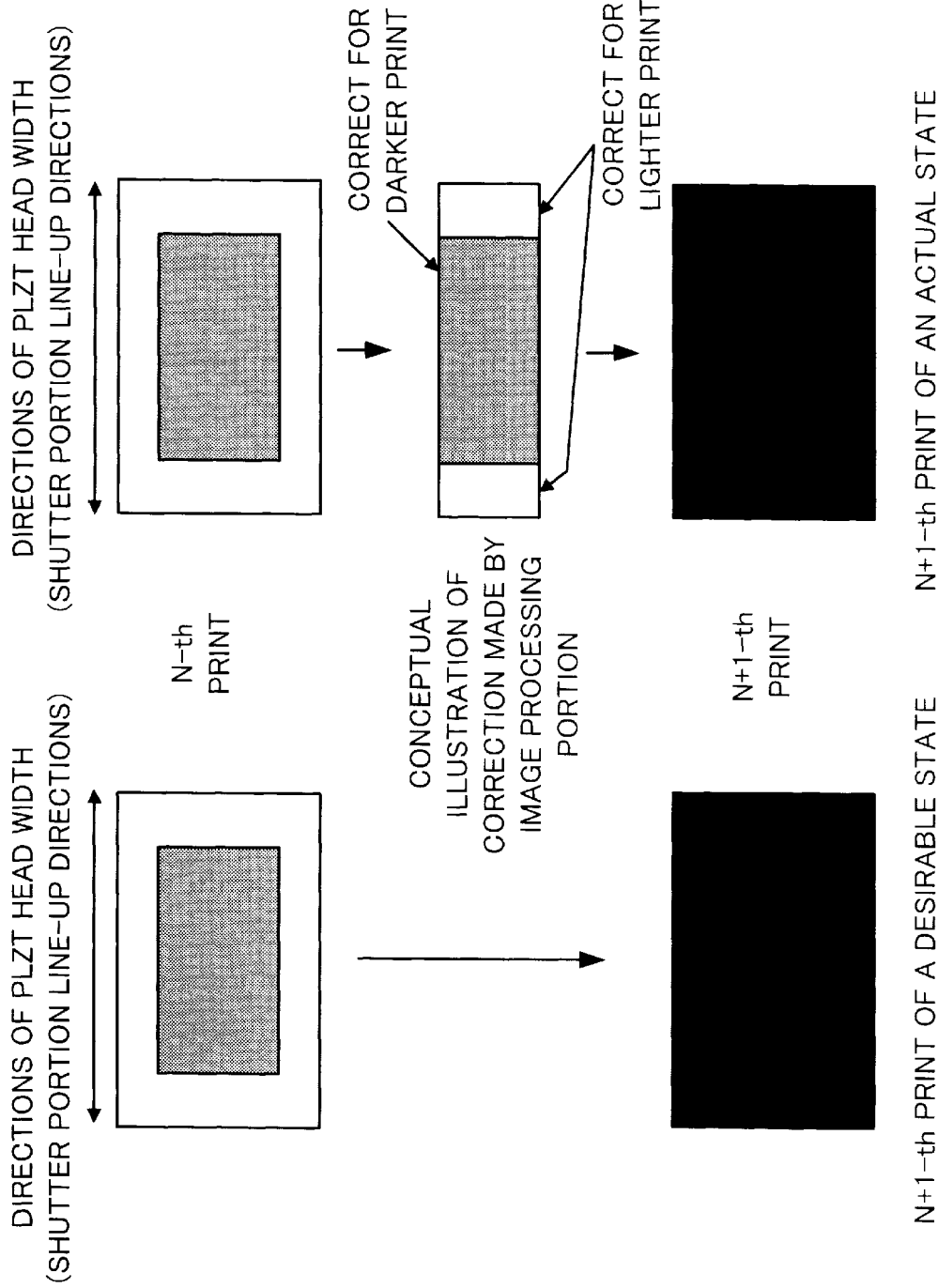

IMAGE RECORDING APPARATUS AND IMAGE RECORDING METHOD

BACKGROUND OF THE INVENTION

1. Field of the Invention

The present invention relates to an image recording apparatus and an image recording method, and more specifically to an image recording apparatus and an image recording method using a digital line-exposing device for exposure of a photosensitive material.

2. Description of the Related Art

Conventionally, when a PLZT (lead lanthanum zirconate titanate) head is used for exposure of a photosensitive material, there is a problem that an intensity of irradiation light from each shutter portion (optical outputting portion) of the PLZT head changes depending on an ON/OFF frequency of the shutter portion. In order to solve this problem, generally, an optical sensor is run widthwise of the PLZT head to perform scanning for measurement of the intensity of the irradiation light from each shutter portion, and correction to the intensity of the irradiation light (known as a shading correction) is performed periodically.

For example, according to a proposal in Japanese Patent Laid-Open No. 6-347923 made by the applicant of the present invention, when a timer has accumulated a predetermined amount of time, the photosensitive material is removed from an exposing portion, and the optical sensor is run to make the scan for measuring the irradiation light intensity of the PLZT head. Then, based on the measurements, a ratio of the measured irradiation light intensity to a norm value is obtained for each of the shutter portions of the PLZT head as a measured data, and an inverse of the measured data is obtained as a correction data. This correction data is multiplied by an amount of exposure, and a resulting product is used as a basis for determining a corrected exposure time.

However, according to the above proposal, although the irradiation light intensity can be corrected, an accurate detection and calculation of the irradiation light intensity must be performed for each shutter portion, spending about 20 minutes. This causes another problem of decreased processing capacity of the image recording apparatus due to a loss of time. Especially, when the proposal disclosed in Japanese Patent Laid-Open 6-347923 is used, the decrease in the processing capacity becomes more significant if the timer is set to a shorter accumulation time.

SUMMARY OF THE INVENTION

It is therefore a primary object of the present invention to provide an image recording apparatus and an image recording method capable of performing the correction to the irradiation light intensity without decreasing the processing capacity.

According to an aspect of the present invention, there is provided an image recording apparatus for recording an image in a photosensitive material, comprising: a recording head having a plurality of optical outputting portions, for an exposure of the photosensitive material; and an adjusting means for adjustment of an intensity of light irradiated from the recording head to the photosensitive material for the exposure, based on an exposure data already used in another exposure by the recording head.

According to another aspect of the present invention, there is provided an image recording method through an exposure of a photosensitive material by a recording head having a plurality of optical outputting portions, comprising an adjusting step of adjusting an intensity of light irradiated from the recording head to the photosensitive material for the exposure, based on an exposure data already used in another exposure by the recording head.

According to the present invention, the irradiation light intensity is adjusted based on an exposure data already used in another exposure. Therefore, differing from the convention, there is no need for providing a separate time for measuring the irradiation light intensity and correcting the exposure data, and thus it becomes possible to prevent the loss of time. As a result, the irradiation light intensity can be corrected without decreasing the processing capacity.

According to the present invention, preferably, when the irradiation light intensity is adjusted and if a photosensitive material is of a size of a print, an interval exposure data differing from an exposure data used in an exposure of an N-th photosensitive material is obtained. The recording head performs an interval exposure based on the interval exposure data, between the exposure of the N-th photosensitive material and an exposure of the N+1-th photosensitive material.

By adjusting the irradiation light intensity characteristics of the recording head as described above, it becomes possible to prevent the exposure of the N+1-th photosensitive material from being affected by the exposure of the N-th photosensitive material. Further, since the recording head is adjusted during the time between the exposures, the correction of the irradiation light intensity can be performed without a loss of time. Still further, since there is no photosensitive material placed right beneath the recording head between the exposures, the interval exposure does not expose any photosensitive material.

In should be noted here that according to the present invention, the term interval exposure refers to an exposure performed by the recording head between an exposure of an N-th photosensitive material and an exposure of an N+1-th photosensitive material. The term interval exposure data refers to an exposure data used in the interval exposure.

Further, preferably, the interval exposure data is an inversion of a gradient of the exposure data used in the exposure of the N-th photosensitive material. Even if the amount of exposure is not uniform in the N-th photosensitive material, the amount of light irradiation from each of the optical outputting portions of the recording head can be uniformed for the exposure of the N+1-th photosensitive material by performing the interval exposure based on the above interval exposure data before the exposure of the N+1-th photosensitive material. Therefore, the correction to the irradiation light intensity can be made even more effectively.

Otherwise, preferably, the interval exposure data is prepared by inverting a value representing presence or absence of optical output from each of the optical outputting portions in the exposure of the N-th photosensitive material. In this case, presence or absence of the optical output during the exposure of the N-th photosensitive material is checked for each of the optical outputting portions of the recording head. Then, the interval exposure data is prepared so that an optical output in the interval exposure will be reversed. More specifically, if there was not an optical output from the optical outputting portion in the exposure of the N-th photosensitive material, then the interval exposure data for this particular optical outputting portion will be such that there will be an optical output in the interval exposure. On the contrary, if there was an optical output from the optical outputting portion in the exposure of the N-th photosensitive material, then the interval exposure data for this particular optical outputting portion will be such that there will not be an optical output in the interval exposure. The interval exposure is performed based on the interval exposure data prepared in the above manner. In this way, the interval exposure data can be prepared easily depending on the presence or absence of the optical output in the exposure of the N-th photosensitive material.

According to the present invention, preferably, when the adjustment of the irradiation light intensity is performed, exposure data of a predetermined number of lines already used in an exposure by the recording head is maintained, and the correction to the exposure data for a next exposure is made based on the maintained exposure data. In this case, when the exposure is performed, the exposure data for the next exposure is corrected based on old exposure data already used in another exposure. Therefore, differing from the conventions, there is no need for providing a time separately for correcting the exposure data, and the irradiation light intensity is corrected without a loss of time.

Further, preferably, when the exposure data is corrected, the exposure data is corrected by first obtaining an average value of exposure data for each of the optical outputting portions of the recording head by averaging the maintained old exposure data of a predetermined number of lines for each of the optical outputting portions; and then determining a value of a correction coefficient for each of the optical outputting portions based on the average value of the exposure data; and finally correcting the exposure data for the next exposure for each of the optical outputting portions based on the correction coefficient. The exposure is made depending on the corrected exposure data. By correcting the exposure data for each optical outputting portion based on the average value of the past exposure data, an exposure data correction which takes into account a historical exposure situation can be performed, making possible to correct the irradiation light intensity more effectively.

Further, preferably, if the exposure data includes an exposure time, the value of the correction coefficient is determined with reference to a coefficient calculation data indicating a relationship between the exposure time and the correction coefficient, and based on the average value of the exposure time, and the correction to the exposure time for the next exposure is made by making a multiplication between the determined correction coefficient and the exposure time to be used for the next exposure.

Specifically, in this case, the coefficient calculation data indicating a relationship between the exposure time of the recording head and the correction coefficient is prepared in advance. The exposure time of the recording head is picked up from the maintained exposure data and averaged for each optical outputting portion to obtain the average value of the exposure time. Then, the correction coefficient is determined for each optical outputting portion with reference to the coefficient calculation data and based on the average value of the exposure time. Then, the correction to the exposure time for the next exposure is made by making a multiplication between the correction coefficient and the exposure time to be used for the next exposure. As described above, by using the past exposure data as a basis and by referring to the coefficient calculation data prepared in advance, the exposure time can be corrected easily without performing a complex calculation.

Further, preferably, when the exposure data is corrected, correction to an exposure data of an N+1-th print is made based on the exposure data of an N-th and preceding prints. This reduces an amount of data processing, and is effective particularly in a line exposure. Specifically, when the line exposure is performed, if the correction coefficient is calculated and correction to the exposure data is performed for each line, the amount of data which must be processed becomes so large that an arithmetic means capable of a high speed processing must be used. However, the amount of data processing can be considerably reduced and a burden of the calculation can be lessened for the N+1-th print by not calculating the correction coefficient for each line, but by calculating the correction coefficient for each optical outputting portion based on the exposure data for the N-th and the preceding prints, and by correcting the exposure data for the N+1-th print based on the correction coefficient.

Further, preferably, the photosensitive material is transported to a location where the exposure can be performed, and the recording head performs a line exposure of the photosensitive material transported to the location where the exposure can be performed. Specifically, for example, a photosensitive material cut to a size is successively transported to the location where the exposure can be performed, and the recording head performs the line exposure successively to the transported photosensitive material. According to this case, an amount of the exposure data outputted to the recording head at one time can be an amount necessary for exposing one line or a plurality of lines. Therefore, as compared with an area exposure, the amount of data processing at a time can be reduced.

Preferably, the recording head is a PLZT head using a PLZT device. If the PLZT device capable of high-speed response is used as described above, the processing capacity can be improved. Especially, differing from a head in which a residual image persists after the light is turned off, the PLZT head does not leave this adverse effect of the interval exposure in the exposure of the next photosensitive material. Therefore, the interval exposure can be used more effectively.

The above object, other objects, characteristics, aspects and advantages of the present invention will become clearer from the following detailed description to be presented with reference to the accompanying drawings.

BRIEF DESCRIPTION OF THE DRAWINGS

FIG. 2A is a plan view showing a PLZT head, whereas FIG. 2B is a side view showing a section of the PLZT head;

FIG. 6A and FIG. 6B are illustrations showing a result of printing if the interval exposure is performed;

FIG. 11A and FIG. 11B are illustrations showing a result of printing if a correction according to the present invention is performed.

DETAILED DESCRIPTION OF THE PREFERRED EMBODIMENT

Embodiments of the present invention will be described here below with reference to the attached drawings.

First, description will be made for a case in which an interval exposure is performed for adjustment of the irradiation light intensity in an image recording apparatus 10 as an embodiment of the present invention.

Figure 1:
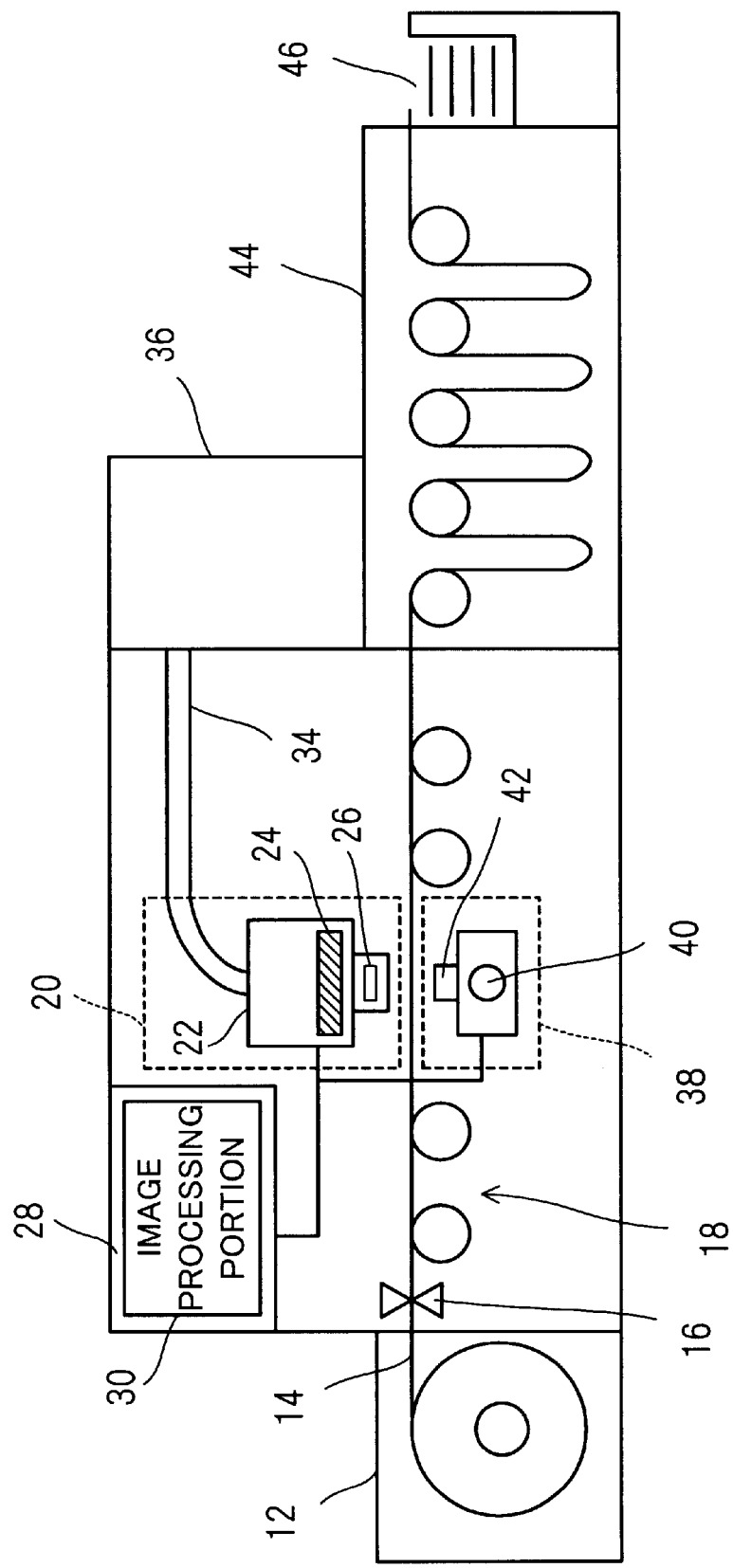
FIG. 1 is an overall schematic diagram of an embodiment of the present invention.

Referring now to FIG. 1, the image recording apparatus 10 comprises a magazine 12. The magazine 12 is loaded with a roll of an unexposed undeveloped photosensitive material 14. The photosensitive material 14 is cut by a cutter 16 into a size of a print, and then transferred by a transporting portion 18 toward a PLZT exposing portion 20.

The PLZT exposing portion 20 includes a PLZT head 22. The PLZT head 22 includes a PLZT shutter array 24 and a selfoc lens array 26 for projection of an image from the PLZT shutter array 24 to the photosensitive material 14.

Figures 2A, 2B:
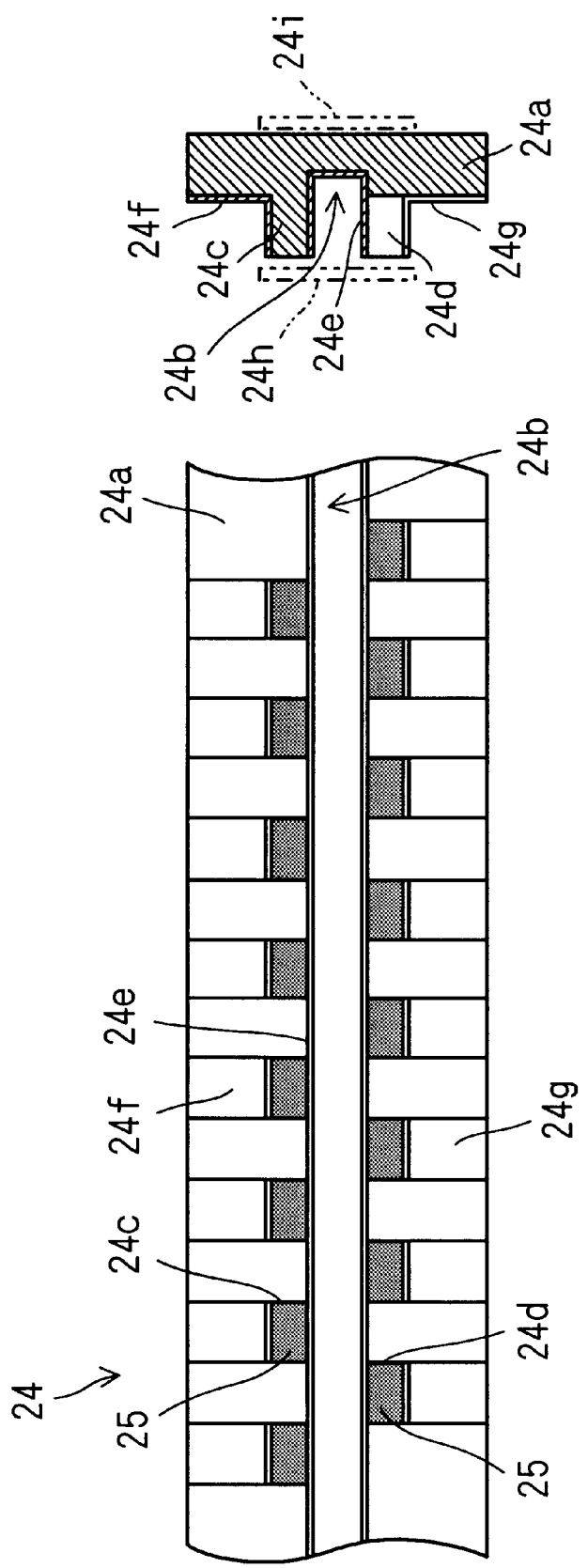

The PLZT shutter array 24 is made of a highly dielectric transparent ceramic material. The material is obtained by adding lanthanum to lead titanate zirconate, and a unique electro-optical effect of the material is utilized. The PLZT shutter array 24 includes, as shown in FIGS. 2A and 2B for example, a plurality of long strip-shaped PLZT devices 24a provided widthwise of the photosensitive material 14. The PLZT device 24a has a surface formed with a longitudinal groove 24b running in a center portion thereof. The groove 24b is sandwiched by a pair of rows of multiple projections 24c, 24d faced with each other at a half-pitch offset. The groove 24b has a surface formed with a common electrode 24e. Each of the projections 24c, 24d has a side surface away from the groove 24b, formed with a corresponding drive electrode 24f or 24g. The PLZT device 24a also has upper surfaces formed with the drive electrodes 24f, 24g respectively. Further, the side formed with the projections 24c, 24d and a bottom side of the PLZT device 24a are respectively formed with polarizing layers 24h, 24i each having a polarizing plane with a direction of polarization perpendicular to each other.

According to the PLZT shutter array 24 with the above arrangement, when a predetermined level of electric drive voltage is applied between the common electrode 24e and drive electrodes 24f, 24g, light entered in the polarizing layer 24i passes via the projections 24c, 24d to the polarizing layer 24h. On the other hand, the light is shut when the application of the voltage is stopped. Specifically, a portion of the projections 24c, 24d on a side of the polarizing layer 24h (a portion shaded by dots in FIG. 2A) functions as a shutter portion 25, i.e. an optical outputting portion, which acts as an ON/OFF controlling portion of the passing of the light. Each of the shutter portions 25 corresponds to a pixel of the exposure data. Thus, if one of the shutter portions 25 corresponding to a pixel of the exposure data is applied with the drive voltage, this shutter portion 25 opens to allow light from a light source 36 to irradiate onto the photosensitive material 14, letting the photosensitive material 14 to be exposed to the light. Therefore, by controlling an amount of time for which the drive voltage is applied to the shutter portion 25, a period of time for which the shutter portion 25 is opened can be controlled, and therefore the exposure time can be controlled.

It should be noted here that the number of shutter portions 25 of the PLZT shutter array 24 is made to correspond to the number of the pixels in one line of the exposure data. (According to the present embodiment, the number of the shutter portions is 5088). In addition, each of the selfoc lenses of the selfoc lens array 26 is faced to the corresponding shutter portion 25 of the PLZT shutter array 24.

A photosensitive material detecting sensor 27 (See FIG. 3.) is provided near the PLZT head 22. The photosensitive material detecting sensor 27 detects presence of the photosensitive material 14 right beneath the PLZT head 22. A result of the detection is sent to a CPU 30a (to be described later).

Figure 3:
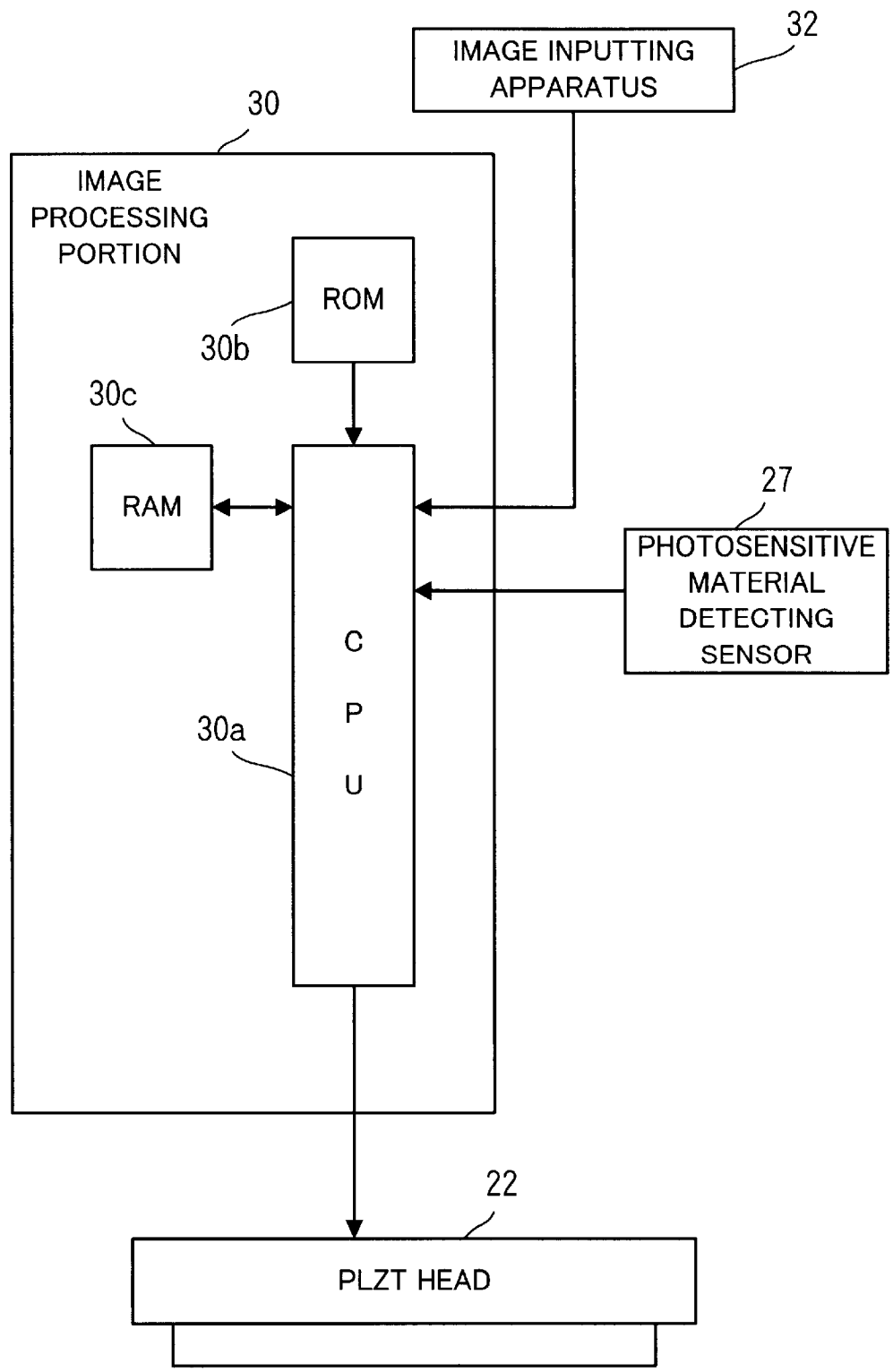
FIG. 3 is a block diagram showing a primary portion of the present invention.

The PLZT head 22 is supplied with exposure data by a controlling portion 28, which includes an image processing portion 30 shown in FIG. 3. The image processing portion 30 includes the CPU 30a which controls operations of the image processing portion 30, a ROM 30b which stores information such as a program for the CPU 30a to perform the control operations, and a RAM 30c which temporarily stores image data, exposure data and so on.

The CPU 30a is supplied with an image data for an exposure, by an image inputting apparatus 32 such as a scanner. The image data may be prepared by reading a photograph film such as a negative/positive or a reflective document by the scanner. Further, the CPU 30a may be supplied with an image data prepared by an unillustrated personal computer. Each of these image data is converted by the CPU 30a into an exposure data for exposing the photosensitive material 14.

Further, when the interval exposure is performed, the CPU 30a inverts a gradient of the image data for each of the pixels, performs a feeding compression of the prepared data as necessary, and then converts the prepared data into an interval exposure data. This means that the gradient in the interval exposure data is an inversion of the gradient of the exposure data used in an exposing operation of the photosensitive material 14 immediately before the interval exposure. The exposure data is sent from CPU 30a to the PLZT head 22 at a predetermined timing.

The PLZT head 22 is driven based on the supplied exposure data, and the photosensitive material 14 is exposed by the light sent through optical fibers 34 from the light source 36. Then, between the exposures, the interval exposure is performed using an interval space between an N-th photosensitive material 14 and an N+1-th photosensitive material 14. It should be noted here that the PLZT head 22 is a recording head having a one-dimensional array of the PLZT devices 24a provided in the form of a long strip laid perpendicularly to the direction of feed of the photosensitive material 14. For this reason, during the exposing operation, the photosensitive material 14 is transported at a speed synchronous with the drive of the PLZT head 22.

Right beneath the PLZT head 22 with the above arrangement, there is provided a measuring portion 38 for measurement of the irradiation light intensity from the PLZT head 22 as a basis of the correcting operation as described earlier as the conventional operation (Japanese Patent Laid-Open No. 6-347923).

The measuring portion 38 uses a feed screw 40 for allowing a sensor 42 to scan right beneath the PLZT head 22, in directions perpendicular to the transportation direction of the photosensitive material 14, for measurement of the irradiation light intensity of the PLZT head 22 for each pixel (for each of the shutter portions 25 in a direction perpendicular to the direction of the feed of the photosensitive material 14). The measured irradiation light intensity is reported to the controlling portion 28. The controlling portion 28 calculates the correction data for adjusting the irradiation light intensity for each pixel according to the conventional method. When the exposing operation is resumed after the measurement, the correction data is taken into account for the exposures. Note should be made here that this correcting operation is a conventional method as has been mentioned earlier, and is a technique that is used herein only incidentally.

Then, the photosensitive material 14 exposed by the PLZT exposing portion 20 is transported to the developing portion 44, where steps of luminescence development, breaching, fixing, stabilizing, and drying are performed, and finally a finished print 46 recorded with the image is discharged.

Figure 4:
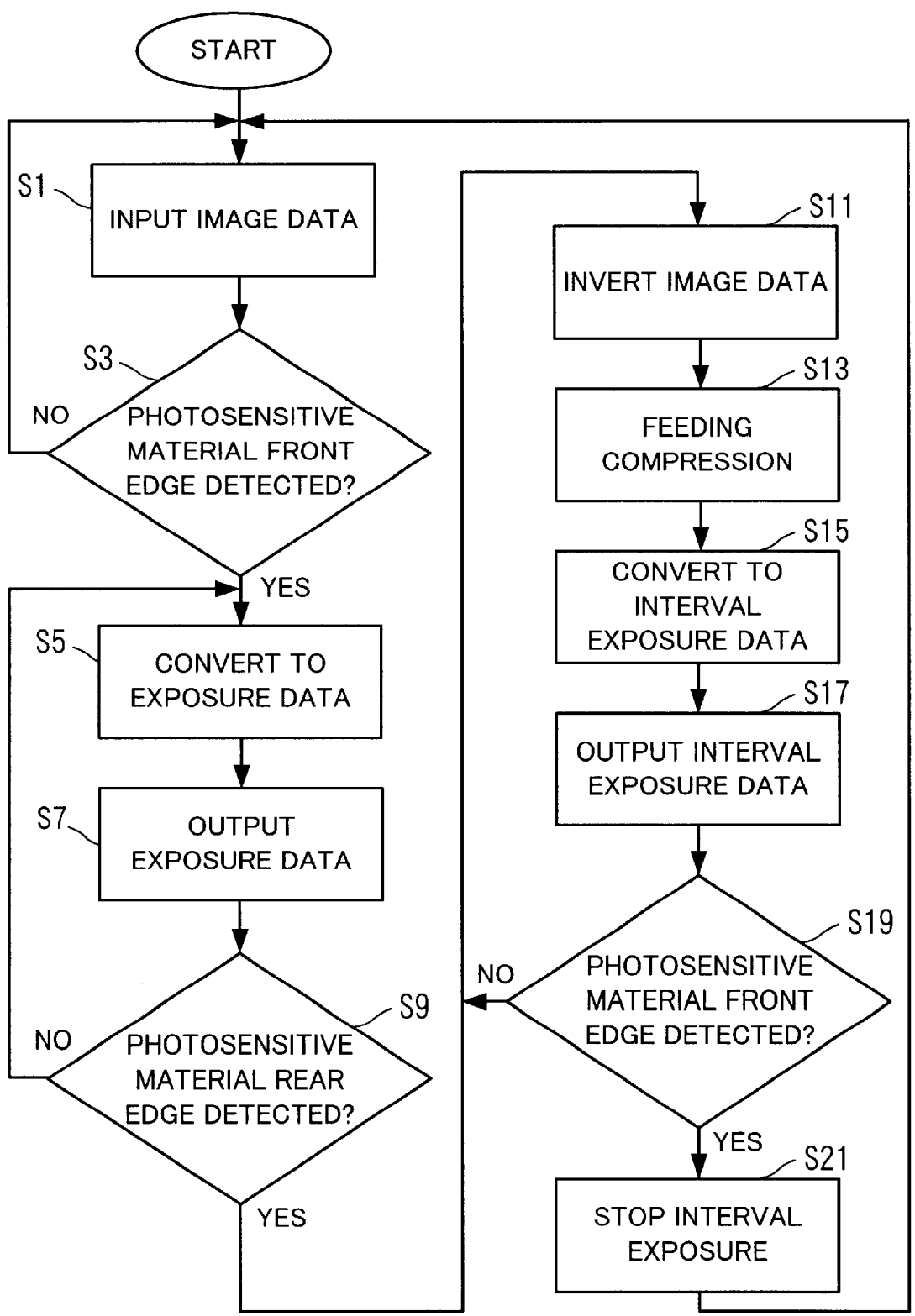
FIG. 4 is a flowchart showing an example of operations according to present invention.

Now, operations of the image recording apparatus 10 as above will be described with reference to FIG. 4.

First, an apparatus such as the image inputting apparatus 32 enters the image data for the exposing operation to the CPU 30a (Step S1). Then, decision is made if the photosensitive material detecting sensor 27 has detected a front edge of the photosensitive material 14 (Step S3). The entry of the image data is continued until the front edge of the photosensitive material 14 has been detected. When the front edge of the photosensitive material 14 is detected, the image data is converted into the exposure data (Step S5), and then the exposure data is outputted to the PLZT head 22 (Step S7). Then, decision is made if the photosensitive material detecting sensor 27 has detected a rear edge of the photosensitive material 14 (Step S9). The conversion of the image data into the exposure data and the output of the exposure data to the PLZT head 22 are continued, and the photosensitive material 14 is exposed until the rear edge of the photosensitive material 14 has been detected. When the rear edge of the photosensitive material 14 is detected, the exposure of the photosensitive material 14 is stopped, and then the interval exposure is performed.

Specifically, the gradient of the image data entered from the image inputting apparatus 32 and so on is inverted (Step S11), and the data obtained by the inversion of the gradient is compressed in the direction of the feed of photosensitive material 14 (Step S13). According to the present embodiment, PLZT head 22 exposes line by line, and the feeding compression performed in Step S13 decreases a time interval between the line exposures. By performing the feeding compression in such a way, the interval exposure can be performed appropriately if a gap between two adjacent photosensitive materials 14 is set shorter than a length of the photosensitive material 14 in the direction of feed. However, the feeding compression will not be necessary if the gap between the two adjacent photosensitive materials 14 is not smaller than the length of the photosensitive material 14 in the direction of feed.

Then, the data in the form of feeding compression is converted into the interval exposure data (Step S15). This interval exposure data is outputted to the PLZT head 22. The PLZT head 22 performs the interval exposing operation based on the supplied interval exposure data (Step S17). Thereafter, decision is made if the photosensitive material detecting sensor 27 has detected the front edge of the photosensitive material 14 (Step S19). The operations in Steps S11 through S17 (the interval exposure) are continued until the front edge of the photosensitive material 14 is detected. When the front edge of a next photosensitive material 14 is detected, the interval exposure is stopped (Step S21), and the cycle goes back to Step 1, and the operations described above are repeated.

Specifically, the photosensitive material 14 is exposed from the time when the front edge of the photosensitive material 14 has come right beneath the PLZT head 22 to the time when the rear edge of this photosensitive material 14 has passed right beneath the PLZT head 22, whereas the interval exposure is performed from the time when the rear edge of this particular photosensitive material 14 has passed right beneath the PLZT head 22 to the time when the front edge of the next photosensitive material 14 has come right beneath the PLZT head 22. In other words, the exposure of the photosensitive material 14 is alternated with the interval exposure.

According to the image recording apparatus 10, the adjustment can be complete only by performing the interval exposure between the exposures of the photosensitive materials, and in addition, there is no need for correcting the exposure data. Thus, differing from the convention, there is no need for providing time separately for correcting the exposure data, and therefore the loss of time can be eliminated.

Further, even if the correcting operation is performed in the conventional manner by using the measuring portion 38, frequency of such a conventional correcting operation can be dramatically decreased, and therefore the loss of time can be remarkably decreased as compared with the convention.

Further, the interval exposure is performed for the PLZT head 22 by using the interval exposure data prepared by inverting the gradient in the exposure data of the exposure of the photosensitive material 14 performed immediately before this particular interval exposure, and the interval exposure is performed immediately before the exposing operation to the next photosensitive material 14. As a result, an amount of the light irradiation from each of the shutter portions 25 of the PLZT head 22 can be equalized before the exposure of the next photosensitive material 14. Thus, it becomes possible to reduce an aging change of the irradiation light intensity from each of the shutter portions 25, more effectively correct the irradiation light intensity, making possible to obtain a print of a very high quality in that there is virtually no visibly recognizable difference in darkness of the finished prints.

Further, since the exposure is performed line by line by using the PLZT head 22, an amount of data processing at one time can be small. In addition, the PLZT device 24a is capable of responding at a very high speed (about $\frac{1}{1000}$ of that of an LCD). This makes possible to improve processing capacity. Still further, differing from a head (such as FOCRT) in which a residual image persists after the light is turned off, the interval exposure does not adversely affect the exposure of the next photosensitive material 14, allowing more effective use of the interval exposure. As described above, greater advantages are obtained if the PLZT head 22 is used as the recording head.

Here below, reference is made to FIGS. 5A, 5B, 6A and 6B in a description of an effect of the correction to the irradiation light intensity performed by the image recording apparatus 10.

Figure 5A:
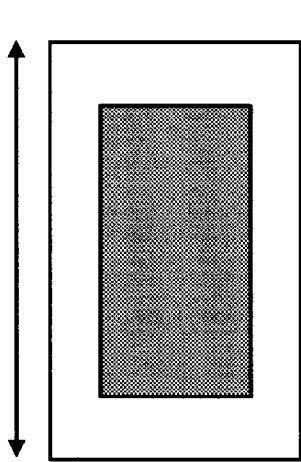
FIG. 5A and FIG. 5B are illustrations showing a difference in darkness (difference in irradiation light intensity among shutter portions) on a print if an interval exposure is not performed.
Figure 5B:
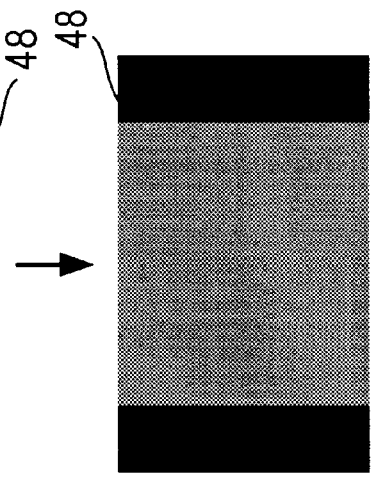

First, reference is made to FIGS. 5A, 5B for describing problems if the PLZT head 22 is used.

Generally, each of the shutter portions 25 of the PLZT head 22 has a characteristic that the irradiation light intensity becomes varied depending on whether the shutter portion 25 was turned on or off at the previous time. This phenomenon is a problem arising uniquely from the PLZT device 24a itself. FIGS. 5A, 5B show an example of this phenomenon. For easier understanding however, difference in resulting prints is exaggerated.

According to the present example, the N-th printing was made with the PLZT head 22 driven in such a way that all the shutter portions 25 except for those in widthwise edge portions of the PLZT head 22 are turned on. On the other hand, the N+1-th printing was made to print pure black all over an exposure region 48. In this case, in the N+1-th print, because of the difference in the irradiation light intensity, difference in darkness appears between the edge portion of the exposure region 48 and the rest of the region of the print (See the bottom illustration in FIG. 5B.) Specifically, if the exposure time in the N-th print was short, then the resulting N-th print becomes a light print but the resulting N+1-th print becomes a dark print. Likewise, if the exposure time in the N-th print was long, then the resulting N-th print becomes a dark print but the resulting N+1-th print becomes a light print. In other words, the exposure is affected by the previous exposures.

Reference is now made to FIGS. 6A, 6B for describing operations according to the present invention.

In this case, the interval exposure is performed between the N-th print and the N+1-th print.

Examples shown in FIGS. 6A, 6B were exposed basically the same way as those in FIGS. 5A, 5B. Specifically, N-th printing was made with the PLZT head 22 driven in such a way that all the shutter portions 25 except for those in the widthwise edge portions of the PLZT head 22 were turned ON. Then, however, the interval exposure was performed, in which the gradient of the image in the N-th print was inverted and feeding compression was performed to the inverted data so as to produce an image shown as the middle image of FIG. 6B. Then, as shown in the bottom image of FIG. 6B, in the N+1-th print, a desired print is obtained without the adverse affect from the N-th exposure.

As described above, by performing the interval exposure, quality of the next print can be improved without loss of time.

It should be noted here that as will be clearly understood from FIG. 6B, the image from the interval exposure has a smaller dimension in the direction of transportation than those of the normal images (the N-th, and N+1-th images). This is because the interval is set to a possible shortest for improved processing capacity of the image recording apparatus 10. The interval, i.e. the gap between two adjacent photosensitive materials 14, is generally set to 15 mm through 40 mm.

Figure 7:
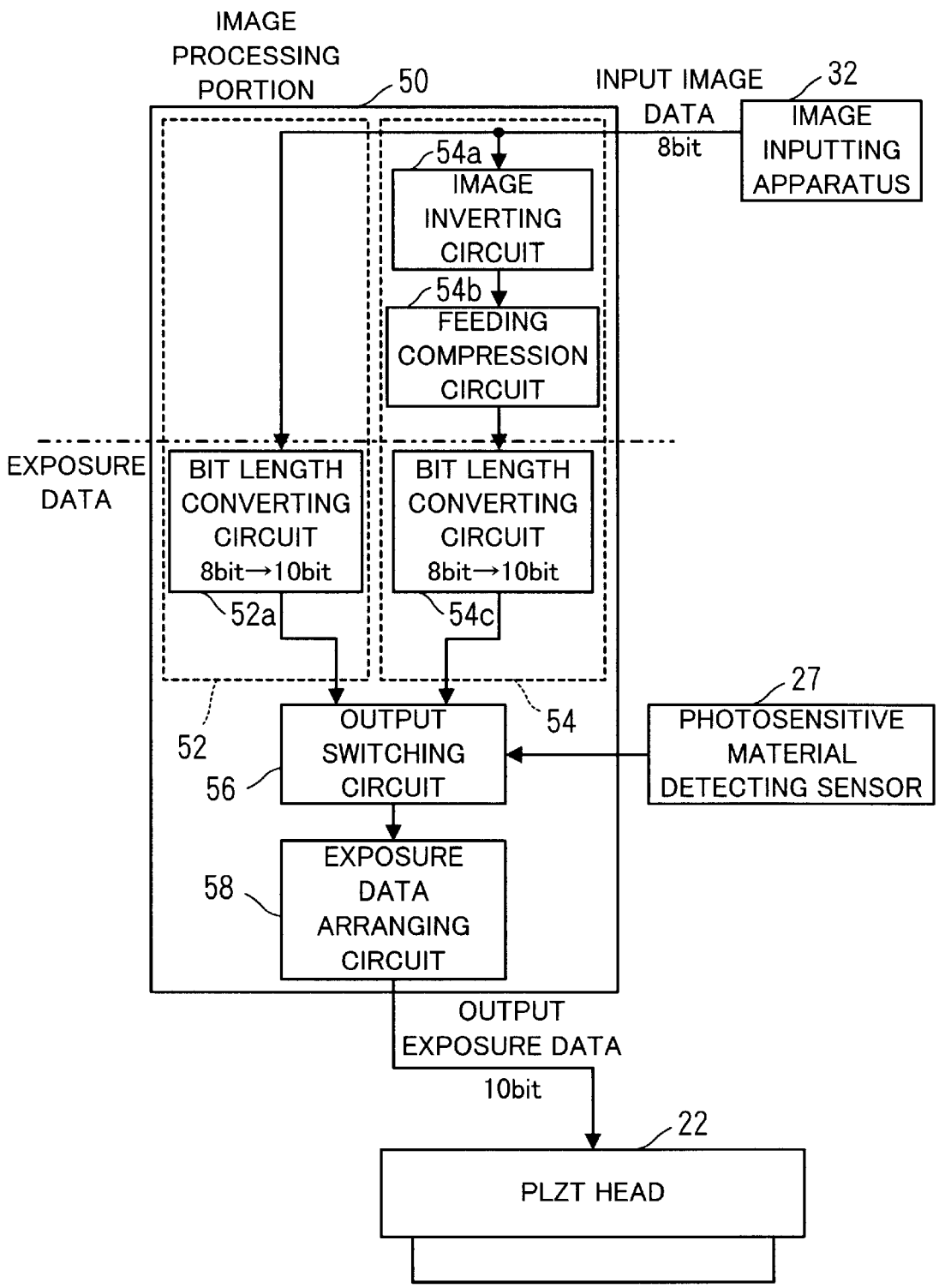
FIG. 7 is a block diagram showing another example of an image processing portion.
Figure 8:
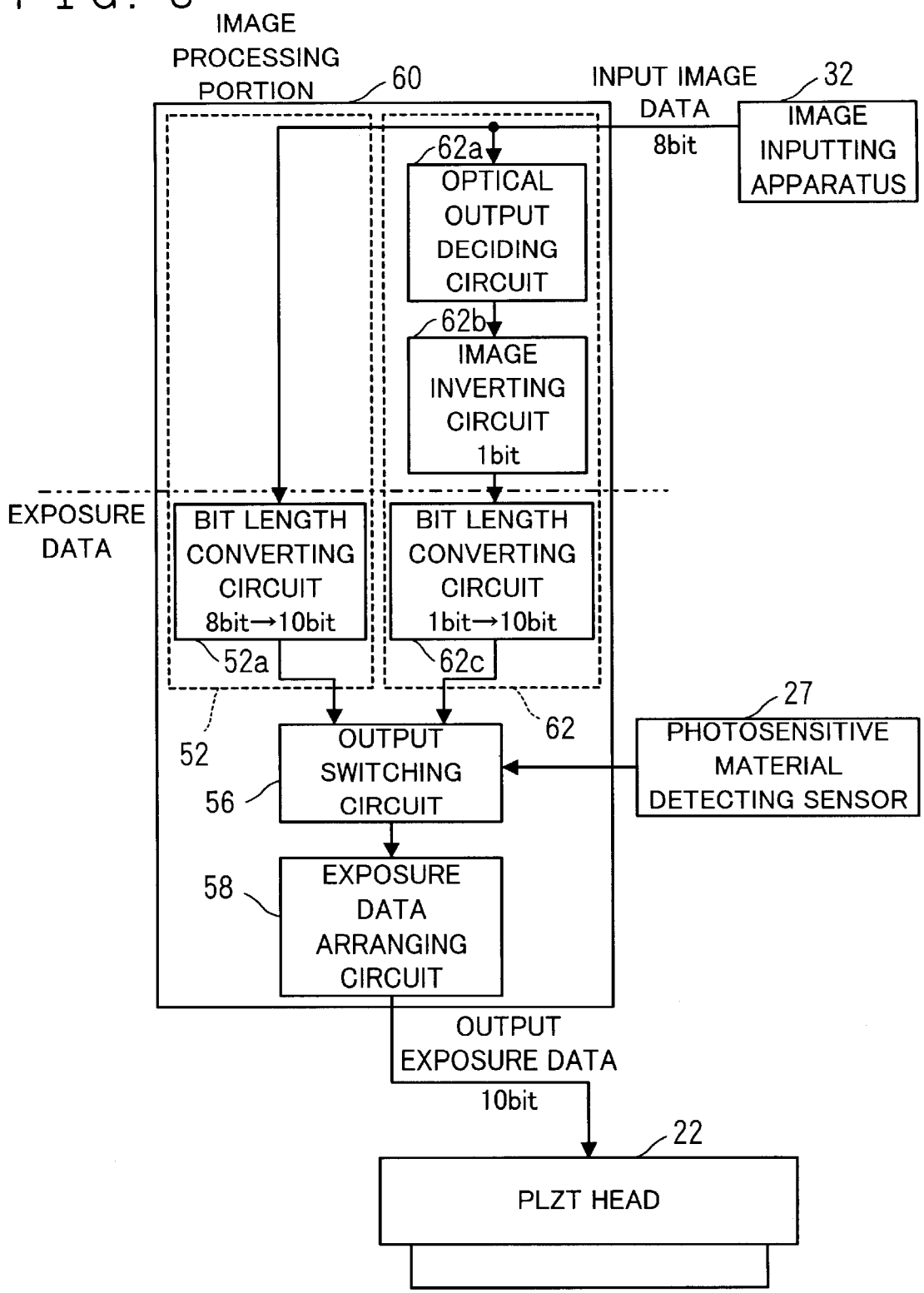
FIG. 8 is a block diagram showing still another example of an image processing portion.

Further, as shown in FIG. 7, the image processing portion may be constituted by hardware as an image processing portion 50.

The image processing portion 50 includes an exposure data generating portion 52 for generating the exposure data for exposing the photosensitive material 14, an interval exposure data generating portion 54 for generating the interval exposure data, an output switching circuit 56 for selecting the exposure data for output according to the result of detection performed by the photosensitive material detecting sensor 27, and an exposure data arranging circuit 58 for arranging the exposure data for the PLZT head 22 to perform an exposure.

The exposure data generating portion 52 includes a bit length converting circuit 52a for converting an 8-bit image data into a 10-bit exposure data. The interval exposure data generating portion 54 includes an image inverting circuit 54a for inverting the gradient of the image data of each pixel entered by the image inputting apparatus 32 and so on, a feeding compression circuit 54b for compressing the data obtained by the gradient inversion in the direction of feed of the photosensitive material 14, and a bit length converting circuit 54c for converting the 8-bit data obtained by the feed compression into a 10-bit data for exposure.

According to the image processing portion 50 with the above arrangement, the image data from the image data inputting apparatus 32 and so on is sent to the exposure data generating portion 52 and the interval exposure data generating portion 54 for generation of the exposure data for exposing the photosensitive material 14 and the interval exposure data respectively. Then, depending on the result of detection of the photosensitive material 14 performed by the photosensitive material detecting sensor 27, the output switching circuit 56 selects the exposure data generating portion 52 or the interval exposure data generating portion 54, for sending the exposure data to the exposure data arranging circuit 58. The exposure data arranging circuit 58 prepares and send a row of exposure data for each line to the PLZT head 22.

As a result, the exposure is performed while the photosensitive material 14 is right beneath the PLZT head 22, whereas the interval exposure is performed while the photosensitive material 14 is not right beneath the PLZT head 22.

If the image recording apparatus 10 is constituted by using the image processing portion 50, the same effect is obtained as achieved by using the image processing portion 30 shown in FIG. 3.

Further, the hardware image processing portion may be an image processing portion 60.

The image processing portion 60 is essentially the same as the image processing portion 50 shown in FIG. 7, except for an interval exposure data generating portion 62. Thus, description will not be repeated for identical portions.

The interval exposure data generating portion 62 includes an optical output deciding circuit 62a, an image inverting circuit 62b, and a bit length converting circuit 62c.

The optical output deciding circuit 62a decides for each shutter portion 25 (of the total of 5088 shutter portions according to the present embodiment) of the PLZT head 22, if an entered image data is 0 (which means pure white where the shutter portion 25 will be held closed, and there will be no optical output), or other than 0 (which means any other than pure white, where the shutter portion 25 will be opened to make an optical output). The decision if the data is 0 or other is made for every image data successively sent in accordance with the direction of the feed of the photosensitive material 14 for a whole of a print. Thus, a value representing presence or absence of the optical output is obtained for each of the shutter portions 25, showing if the shutter portion 25 will never be turned on or will be turned on at least one time.

The value representing presence or absence of the optical output obtained by the optical output deciding circuit 62a is sent to the image inverting circuit 62b as a one-bit data. The image inverting circuit 62b then inverts the given data.

Specifically, the data is inverted in such a manner that each of the shutter portions 25 which will not turn on at all during the exposure of the photosensitive material 14 will turn on in the interval exposure performed immediately thereafter. On the other hand, those which will turn on at least once during the exposure of the photosensitive material 14 will not turn on in the interval exposure performed immediately thereafter. A data obtained by the inversion is sent to the bit length converting circuit 62c, where the one-bit data is converted into the ten-bit interval exposure data of a predetermined format for the interval exposure. For example, if the one-bit data is "0", the converted data will be "0000000000" whereas the data "1" will be converted into "1111111111", by simply repeating the original data for 10 times. The method for converting into the 10-bit interval exposure data is not limited to this, however. The data may be converted into a predetermined fixed value, for example. As described above, the interval exposure data can be easily created depending on the presence or absence of the optical output.

With the above arrangement, the image processing portion 60 does not turn ON (does not open) any of the shutter portions 25 which turned ON (opened) at least one time during the exposures in the previous print, in the interval exposure performed immediately thereafter. On the other hand, each of those shutter portions 25 which was never turned ON (was not opened) during the exposures in the previous print is turned ON (is opened) based on the same interval exposure data, in the interval exposure performed immediately thereafter.

If the image processing portion 60 is used to constitute the image recording apparatus 10, there is another advantage in addition to the elimination of loss time, the capability of correcting the irradiation light intensity and so on. Specifically, there is no need for the feeding compressing circuit since the interval exposure is performed based on the interval exposure data that is univocally converted by the bit length converting circuit 62c.

Figure 9:
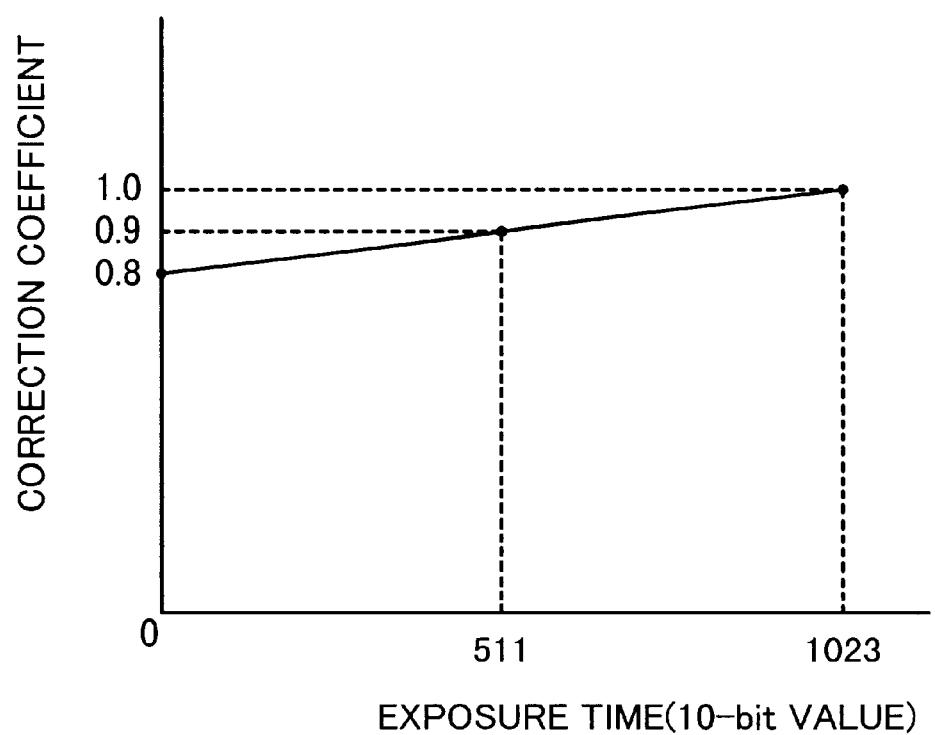
FIG. 9 is a graph showing a coefficient calculation data indicating a relationship between an exposure time and a correction coefficient.

Next, description will be made for a case where the image recording apparatus 10 performs correction to an exposure data to be used in an exposure, for adjustment of the irradiation light intensity. In this case the ROM 30b included in the image processing portion 30 stores a program for controlling operations performed by the CPU 30a, coefficient calculation data, as shown in FIG. 9, indicating a relationship between an exposure time (converted in a 10-bit value) by the PLZT head 22 and a correction coefficient, and other information.

The RAM 30c temporarily stores a determined value of the correction coefficient and so on. In addition, the exposure data (the exposure time according to the present embodiment) to be given to the PLZT head 22 is accumulated as historical information. As a result, the exposure data already used for the exposure by the PLZT head 22 can be managed for each pixel. The RAM 30c also stores the number of lines of the exposure data.

The CPU 30a calculates an average exposure time for each pixel, i.e. each shutter portion 25, and determines the value of the correction coefficient for each shutter portion 25 based on the average value. According to the present embodiment, the exposure time is set anywhere between 0 μs through about 600 μs, or 0 through 1023 when converted into the 10-bit form (1023 corresponds to about 600 μs in the actual conversion), based on which the value of the correction coefficient is calculated. According to FIG. 9, if the average exposure time is 0, the correction coefficient will be 0.8. If the average exposure time is 511, the correction coefficient will be 0.9, and if the average exposure time is 1023, the correction coefficient will be 1. The correction operation is performed based on a linear approximation of these three points.

More specifically, the CPU 30a determines the correction coefficient for each shutter portion 25 based on an exposure data for predetermined number of lines stored in the RAM 30c, and the exposure data is corrected for the next print based on this correction coefficient.

The PLZT head 22 is driven based on the given exposure data, so that each of the pixels in the photosensitive material 14 is exposed by the light from the light source 36 sent via the optical fibers 34 for the corrected amount of exposure time. It should be noted here that the PLZT head 22 is a recording head having a one-dimensional array of the PLZT devices 24a provided in the form of a long strip laid perpendicularly to the direction of feed of the photosensitive material 14. For this reason, during the exposing operation, the photosensitive material 14 is transported at a speed synchronous with the drive of the PLZT head 22.

Other constitutions are the same as already described above with reference to FIG. 3, and thus will not be repeated here.

Figure 10:
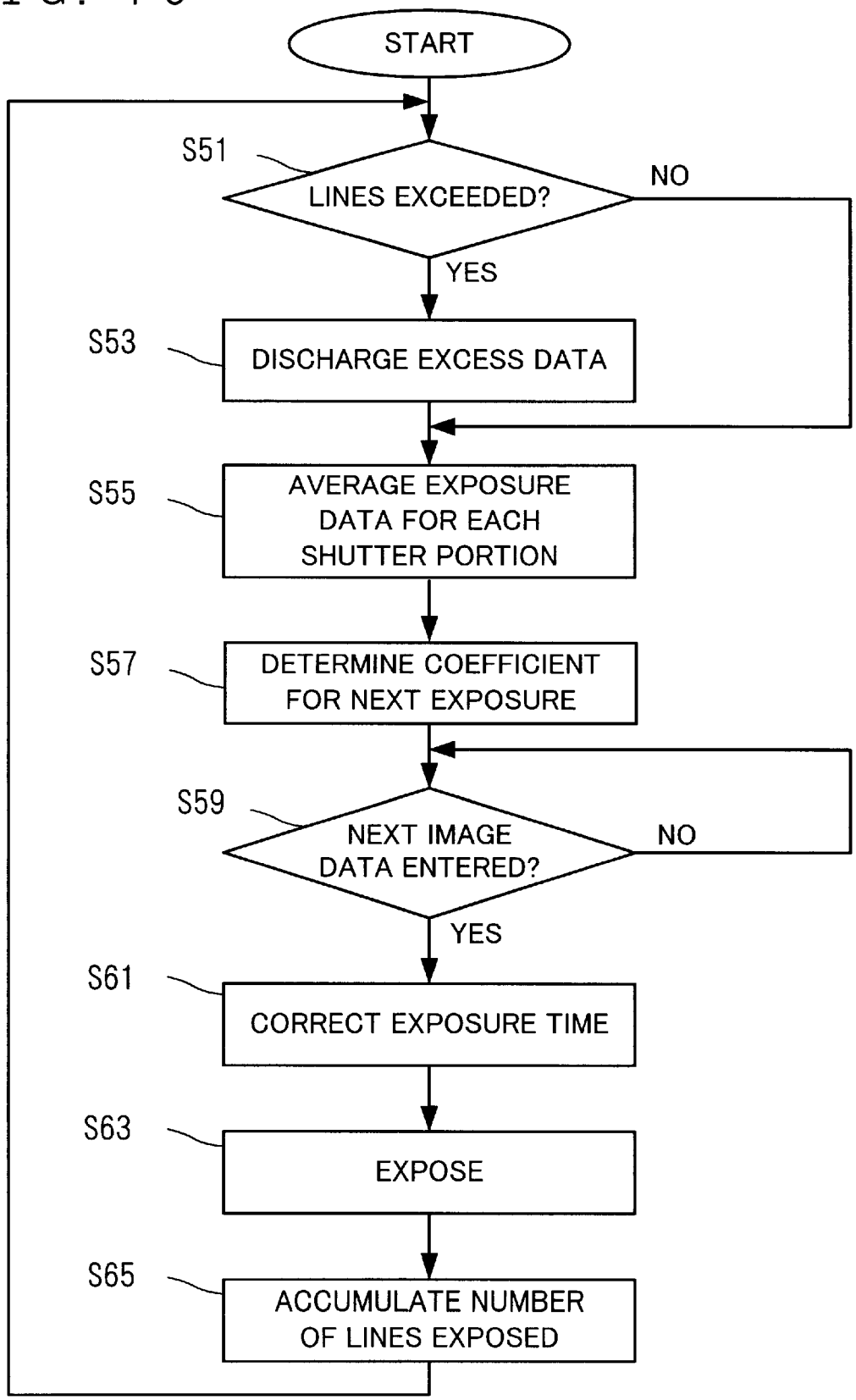
FIG. 10 is a flowchart showing another example of operations according to the present invention.

Now, operations of the image recording apparatus 10 with the above arrangement will be described with reference to FIG. 10. The description will assume that exposure data already used in the N-th and preceding prints is used for correction of exposure data for the N+1-th print.

First, decision is made if the number of lines of the exposure data maintained in the RAM 30c for each pixel has exceeded a predetermined number (10,000 lines of exposures already performed, for example)(Step S51). If exceeded, excess exposure data is discharged (Step S53), and the process goes on to Step S55. If the number of lines of the exposure data has not exceeded in Step S51, the process goes directly to Step S55.

In Step 55, the exposure data (which is the exposure time according to the present embodiment) for the N-th and the preceding prints stored in the RAM 30c are averaged for each shutter portion 25. For example, if the RAM 30c stores exposure data for the N-th and preceding prints, and if the number of the accumulated lines is 10,000, then an average value of the exposure data is calculated for each of the 5088 shutter portions 25 (for one line). Then, the correction coefficient for the next exposure (for the N+1-th print) is determined for each shutter portion 25 by referring to the coefficient calculation data shown in FIG. 9 and based on the average value for each shutter portion 25 (Step S57).

Then, the process waits until a next image data (the image data for the N+1-th print) is entered (Step S59). When the next image data is entered, this image data is converted into an exposure data, and then the exposure data is corrected based on the correction coefficient. Specifically, the correction coefficient obtained for each shutter portion 25 is multiplied by an exposure time of the corresponding pixel for the N+1-th print, so that the exposure time of each pixel for the N+1-th print is corrected (Step S61). Then, the PLZT head 22 performs the exposure, line by line for the corrected exposure time (Step S63), while the number of lines of the exposure data is accumulated at each exposure and stored in the RAM 30c (Step S65), and the process goes back to Step S51, so that the above cycle of steps are repeated.

According to the image recording apparatus 10 as described above, exposure data to be used in an exposure is corrected each time the exposure is made for a print. Therefore, differing from the convention, there is no need for providing a separate time for correcting the exposure data, making possible to prevent loss of time. Further, the exposure can be performed on the basis of the corrected exposure data with the exposure history taken into account. Therefore, the aging change of the irradiation light intensity from each shutter portion 25 can be reduced, and as a result, it becomes possible to obtain a print of a very high quality in that there is virtually no visibly recognizable difference in darkness of the finished prints.

Even if the correcting operation is performed in a conventional manner by using the measuring portion 38, frequency of such a conventional correcting operation can be dramatically decreased, and therefore the loss of time can be remarkably decreased as compared with the convention.

Further, in correcting the exposure data, the correction coefficient is determined by using the coefficient calculation data that shows the relationship between the exposure time and the value of correction coefficient, based on which the exposure time for the next exposure is calculated. Thus, the exposure time is easily corrected without performing a complex calculation.

Further, by correcting the exposure data of the N+1-th print on the basis of the exposure data of the N-th and preceding prints, the amount of data processing can be reduced.

Further, since the exposure is performed line by line by using the PLZT head 22, an amount of data processing at one time can be small. In addition, the PLZT device is capable of responding at a very high speed (about 1/1000 of that of an LCD). This makes possible to improve processing capacity.

Here below, reference is made to FIGS. 11A, 11B for a description of the effect of the correction to the irradiation light intensity performed by the image recording apparatus 10. For easier understanding, the following description will assume that the correction is performed by taking into account an exposure data of a previous print made immediately before.

It should be noted here, that the same problems exist as described with reference to FIGS. 5A and 5B if the PLZT head 22 is used without the correcting operation.

According to the examples in FIGS. 11A, 11B, when exposing for the N-th print, the PLZT head 22 is driven in such a way that all the shutter portions 25 except for those in widthwise edge portions of the PLZT head 22 are turned on, just in the same manner as in the examples in FIG. 5A and 5B. Then, as shown in the middle illustration in the FIG. 11B, the image processing portion 30 performs the correction to the exposure data, so that the widthwise edge portions will get a lighter print whereas the rest of the portion (a center portion) will get a darker print. As a result, as shown in the bottom illustration in FIG. 11B, a desirable print will result in the N+1-th print without the adverse affect from the exposure made in the N-th print.

As described above, by managing the history of each image which was printed, it becomes possible to increase quality of the next print without loss of time.

It should be noted here that according to the example shown in FIGS. 11A, 11B, the correction is performed by taking into account only the exposure data of the previous print made immediately before. In practice, however, a greater volume such as 10,000 lines (for several to about 10 prints) of historical exposure data will be maintained as a basis of the correcting operation. An important point here is to grasp for each shutter portion 25 information on the number of ON actions and the kind of exposure data used for respective ON actions. This is why the number of lines of the exposure data is counted and the exposure data history is maintained.

Further, according to the above embodiments, the exposure data of the N-th print is used for correcting the exposure data of N+1-th print. This is not a limitation however. For example, correction to exposure data for the N+1-th print may be made by calculating a correction coefficient for each line, on the basis of exposure data used in exposures of preceding lines (not only the lines of the N-th and the preceding prints but also those lines already used in the N+1-th print).

Still further, according to the above embodiments, the recording head is the PLZT head 22. This is not a limitation, either. Other recording heads such as LED head, VFP head (fluorescent character display tube), LCS head (liquid crystal), and FOCRT may also be used.

The present invention being described in detail and illustrated thus far, it is obvious that these description and drawings only represent an example of the present invention, and should not be interpreted as limiting the invention. The spirit and scope of the present invention is only limited by words used in the accompanied claims.

What is claimed is:

1. An image recording apparatus for recording an image in a photosensitive material of a size of a print, comprising:
a recording head having a plurality of optical outputting portions, for an exposure of the photosensitive material, the photosensitive material being at least an N-th photosensitive material and an N+1-th photosensitive material, N being an integer, and the N+1-th photosensitive material being subsequent to the N-th photosensitive material; and
an adjusting means for adjustment of an intensity of light irradiated from the recording head to the photosensitive material for the exposure;
wherein the adjusting means includes: means for obtaining an interval exposure data differing from an exposure data used in an exposure of the N-th photosensitive material; and means for allowing the recording head to perform an interval exposure based on the interval exposure data, between the exposure of the N-th photosensitive material and an exposure of the N+1-th photosensitive material;
wherein the interval exposure data is an inversion of a gradient of the exposure data used in the exposure of the N-th photosensitive material.

2. An image recording apparatus for recording an image in a photosensitive material of a size of a print, comprising:
a recording head having a plurality of optical outputting portions, for an exposure of the photosensitive material, the photosensitive material being at least an N-th photosensitive material and an N+1-th photosensitive material, N being an integer, and the N+1-th photosensitive material being subsequent to the N-th photosensitive material; and
an adjusting means for adjustment of an intensity of light irradiated from the recording head to the photosensitive material for the exposure;
wherein the adjusting means includes: means for obtaining an interval exposure data differing from an exposure data used in an exposure of the N-th photosensitive material; and means for allowing the recording head to perform an interval exposure based on the interval exposure data, between the exposure of the N-th photosensitive material and an exposure of the N+1-th photosensitive material,
wherein the interval exposure data is prepared by inverting a value representing presence or absence of optical output from each of the optical outputting portions in the exposure of the N-th photosensitive material.

3. An image recording apparatus for recording an image in a photosensitive material, comprising:
a recording head having a plurality of optical outputting portions, for an exposure of the photosensitive material; and
an adjusting means for adjustment of an intensity of light irradiated from the recording head to the photosensitive material for the exposure, wherein the adjusting means includes: a managing means for maintenance of exposure data of a predetermined number of lines already used in an exposure by the recording head; and a correcting means for correction of an exposure data for a next exposure, based on the maintained exposure data maintained by the managing means.

4. The apparatus according to claim 3, wherein the correcting means includes:
   a first means for obtaining an average value of exposure data for each of the optical outputting portions of the recording head by averaging the exposure data, maintained by the managing means, for each of the optical outputting portions;
   a second means for determining a value of a correction coefficient for each of the optical outputting portions based on the average value of the exposure data; and
   a third means for correcting the exposure data to be used for the next exposure for each of the optical outputting portions based on the correction coefficient.

5. The apparatus according to claim 4, wherein:
   the exposure data includes an exposure time;
   the second means including means for determining the value of the correction coefficient with reference to a coefficient calculation data indicating a relationship between the exposure time and the correction coefficient, and based on the average value of the exposure time; and
   the third means including means for correcting the exposure time for the next exposure, by making a multiplication between the correction coefficient determined by the second means and the exposure time to be used for the next exposure.

6. The apparatus according to claim 4, wherein the correcting means corrects an exposure data of an N+1-th print based on an exposure data of an N-th and preceding prints, N being an integer, and the N-th print preceding the N+1-th print.

7. The apparatus according to one of claims 1 through 6, further comprising a transporting means for transporting the photosensitive material to a location where the exposure can be performed,
   the recording head performing a line exposure of the photosensitive material transported to the location where the exposure can be performed.

8. The apparatus according to one of claims 1 through 6, wherein the recording head is a PLZT head using a PLZT device.

9. An image recording apparatus for recording an image in a photosensitive material of a size of a print, comprising:
   a recording head having a plurality of optical outputting portions; and
   a controlling portion connected to the recording head, for allowing the recording head to perform an interval exposure between an exposure of an N-th photosensitive material and an exposure of an N+1-th photosensitive material based on an interval exposure data differing from an exposure data used in the exposure of the N-th photosensitive material, N being an integer, and the N+1-th photosensitive material being subsequent to the N-th photosensitive material;
   wherein the interval exposure data is an inversion of a gradient of the exposure data used in the exposure of the N-th photosensitive material.

10. An image recording apparatus comprising:
    a recording head having a plurality of optical outputting portions, for an exposure of a photosensitive material;
    a storing medium for maintaining exposure data of a predetermined number of lines already used in an exposure by the recording head; and
    an arithmetic circuit connected to the storing medium, for correction of an exposure data to be used for a next exposure, based on the exposure data maintained by the storing medium.

11. An image recording method through an exposure of a photosensitive material of a size of a print by a recording head having a plurality of optical outputting portions, the photosensitive material being at least an N-th photosensitive material and an N+1-th photosensitive material, N being an integer, and the N+1-th photosensitive material being subsequent to the N-th photosensitive material, comprising
    an adjusting step of adjusting an intensity of light irradiated from the recording head to the photosensitive material for the exposure,
       wherein the adjusting step includes: a step of obtaining an interval exposure data differing from an exposure data used in an exposure of the N-th photosensitive material; and a step of allowing the recording head to perform an interval exposure based on the interval exposure data, between the exposure of the N-th photosensitive material and an exposure of the N+1-th photosensitive material,
       wherein the interval exposure data is an inversion of a gradient of the exposure data used in the exposure of the N-th photosensitive material.

12. An image recording method through an exposure of a photosensitive material of a size of a print by a recording head having a plurality of optical outputting portions, the photosensitive material being at least an N-th photosensitive material and an N+1-th photosensitive material, N being an integer, and the N+1-th photosensitive material being subsequent to the N-th photosensitive material, comprising
    an adjusting step of adjusting an intensity of light irradiated from the recording head to the photosensitive material for the exposure,
       wherein the adjusting step includes: a step of obtaining an interval exposure data differing from an exposure data used in an exposure of the N-th photosensitive material; and a step of allowing the recording head to perform an interval exposure based on the interval exposure data, between the exposure of the N-th photosensitive material and an exposure of the N+1-th photosensitive material,
       wherein the interval exposure data is prepared by inverting a value representing presence or absence of optical output from each of the optical outputting portions in the exposure of the N-th photosensitive material.

13. An image recording method through an exposure of a photosensitive material by a recording head having a plurality of optical outputting portions, comprising
    an adjusting step of adjusting an intensity of light irradiated from the recording head to the photosensitive material for the exposure,
       wherein the adjusting step includes: a first step of maintaining exposure data of a predetermined number of lines already used in an exposure by the recording head; and a second step of correcting an exposure data for a next exposure based on the maintained exposure data.

14. The method according to claim 13, wherein the second step includes:

step A of obtaining an average value of exposure data for each of the optical outputting portions of the recording head by averaging the maintained exposure data for each of the optical outputting portions;

step B of determining a value of a correction coefficient for each of the optical outputting portions based on the average value of the exposure data; and step C of correcting the exposure data to be used for the next exposure for each of the optical outputting portions based on the correction coefficient.

15. The method according to claim 14, wherein:

the exposure data includes an exposure time;

the step B determining the value of the correction coefficient with reference to a coefficient calculation data indicating a relationship between the exposure time and the correction coefficient, and based on the average value of the exposure time; and the step C correcting the exposure time for the next exposure, by making a multiplication between the correction coefficient determined by the step B and the exposure time to be used for the next exposure.

16. The method according to claim 14, wherein the second step corrects an exposure data of an N+1-th print based on an exposure data of an N-th and preceding prints, N being an integer, and the N-th print preceding the N+1-th print.

17. The method according to one of claims 11 through 16, further comprising a step of transporting the photosensitive material to a location where the exposure can be performed, the recording head performing a line exposure of the photosensitive material transported to the location where the exposure can be performed.

18. An image recording apparatus for recording an image in a photosensitive material of a size of a print, comprising:

a recording head having a plurality of optical outputting portions; and a controlling portion connected to the recording head, for allowing the recording head to perform an interval exposure between an exposure of an N-th photosensitive material and an exposure of an N+1-th photosensitive material based on an interval exposure data differing from an exposure data used in the exposure of the N-th photosensitive material, N being an integer, and the N+1-th photosensitive material being subsequent to the N-th photosensitive material, wherein the interval exposure data is prepared by inverting a value representing presence or absence of optical output from each of the optical outputting portions in the exposure of the N-th photosensitive material.

* * * * *